Patented Dec. 11, 1934

1,984,163

UNITED STATES PATENT OFFICE 1,984,163

EARTHENWARE BODY

Ira Elmer Sproat, Covington, Ohio, assignor to
R. T. Vanderbilt Company, Incorporated, New
York, N. Y., a corporation of New York No Drawing. Continuation of application Serial
No. 560,871, September 2, 1931. This application August 24, 1932, Serial No. 630,247

12 Claims.  (Cl. 106—10)

This invention relates to the manufacture of earthenware bodies. It includes both the new products and the method of preparing them.

The new products of this invention are made from a crude pyrophyllite and give the new earthenware products properties which are desirable in wall tile, tableware, etc. I use for this purpose a crude pyrophyllite obtained from the mines of Hemp, North Carolina. It contains considerable sericite as an impurity which serves as a flux to lower the vitrification temperature of the products produced and is therefore particularly adapted for the manufacture of these earthenware products.

The earthenware bodies of this invention may be made from crude pyrophyllite having an alkali content (i. e. $K_2O$ plus $Na_2O$) of 1.5% to about 4%. As the alkali lowers the melting point, the higher alkali content is to be preferred. The silica and alumina contents may vary from about 60 to 70% and from about 24 to 30% respectively. The combined flux content, that is, the content of $TiO_2$, $CaO$, $MgO$, $Na_2O$ and $K_2O$ will preferably run over 3% and up to 5%. The following analysis represents the composition of the average crude pyrophyllite taken from the mine at Hemp during a period of several months and used for the production of earthenware products according to this invention:

| | |
|---|---:|
| $SiO_2$ | 70.15 |
| $Al_2O_3$ | 23.84 |
| $Fe_2O_3$ | 0.07 |
| $TiO_2$ | 0.15 |
| $CaO$ | 0.06 |
| $MgO$ | 0.02 |
| $Na_2O$ | 0.20 |
| $K_2O$ | 1.54 |
| Loss on ignition | 4.00 |

For the purposes of this invention, a crude pyrophyllite containing somewhat less silica and having a higher flux content is to be preferred. For example, a crude pyrophyllite of high sericite content represented by the following analysis:

| | |
|---|---:|
| $SiO_2$ | 60.58 |
| $Al_2O_3$ | 29.31 |
| $Fe_2O_3$ | 0.23 |
| $TiO_2$ | 0.10 |
| $CaO$ | 0.10 |
| $MgO$ | 0.21 |
| $Na_2O$ | 0.06 |
| $K_2O$ | 3.90 |
| Loss on ignition | 5.51 |

The material is satisfactory for the purposes of this invention in substantially the condition in which it is removed from the mine. After grinding it may be advantageously air-floated to separate it from coarse particles of silica and iron, etc. Further iron may be separated by a magnetic separator if desirable. The presence of magnesium compounds is an advantage since this increases the thermal shock of the vitrified products and thus reduces the time required for firing and cooling. A small percentage of calcium is also desirable to supplement the reduction in the vitrification point due to the presence of alkalis. The presence of any considerable quantity of compounds which increase the ratio of alumina to silica appreciably is not desirable.

The improved semi-vitreous earthenware bodies made from a mixture of such crude pyrophyllite and kaolin, etc. have many desirable properties. Their absorption will ordinarily be low, but will depend upon the method of manufacture. Wall tile for example which is ordinarily prepared by a dry pressing process will usually have an absorption of about 14% although it may be as low as 5% or as high as 16%. General ware bodies such as plates, pitchers, etc. made by plastic molding or casting usually have an absorption of about 8%, although it may be as low as 6% or as high as 11%.

The absorption and shrinkage of the semi-porcelain bodies of this invention are more uniform over a wide range of temperatures than the absorption and shrinkage of ordinary semi-porcelain ware. The capacity of continuous kilns for firing bodies of this invention is therefore greater than the capacity of the same kilns for other bodies. A larger quantity of ware can be fired in a continuous kiln without any material increase in fuel cost since the ware does not have to remain in the hot zone of the kiln as long as other ware, in order to be properly matured. Further, due to the more uniform absorption of the semi-porcelain bodies of this invention they do not require the same careful supervision and even treatment during glazing required by other products and the glazed coating will be more uniform in thickness. This materially decreases crazing and other defects which result from the use of too thick a glazed coating.

The color of the finished ware of this invention is more uniform than the color of ware which does not contain pyrophyllite. The uneven discoloration of ordinary earthenware during firing makes the production of stained bodies expensive. They are now generally manufactured from ware placed in certain sections of a kiln during firing where the heat treatment is most uniform, or else ware of substantially the same shade is obtained by selection after firing. The use of pyrophyllite in bodies which are to be stained is therefore particularly advantageous.

It has been found that by using crude pyrophyllite of the type here contemplated in the manufacture of semi-porcelain bodies a large percentage of the cheaper kaolins such as Georgia or South Carolina kaolin can be employed to replace the more expensive kaolins such as English china clay or North Carolina kaolin without the undesirable effects which result from the use of such large percentages of cheap kaolin in ordinary semi-porcelain. Generally the use of more than 7 to 10% of such cheap kaolin produces firecracking and other undesirable effects, but by using a considerable percentage of this crude pyrophyllite, it has been found that as much as 20% of the cheaper Georgia and South Carolina kaolin can be employed and that a superior product is produced.

It has been found that raw uncalcined pyrophyllite can be used in making porous ware such as wall tile which is made by a dry pressing process. The raw pyrophyllite is a smooth substance and it greatly shortens the working properties of a body and decreases its plasticity. However, crude pyrophyllite which has been heated to drive off the water does not have the same shortening effect and it is therefore desirable to calcine the pyrophyllite used in the manufacture of ware which is cast or molded in a plastic state.

In preparing wall tile, for example, it has been found that various formulae using up to 50% of pyrophyllite give satisfactory bodies having a long vitrification range. They have relatively uniform absorption and shrinkage over a wide range of firing temperatures. There is greater uniformity among the products produced than among the usual Cornwall stone and feldspar bodies. The following formulae have been found to give satisfactory results:

|  | 1 | 2 | 3 | 4 |
|---|---|---|---|---|
| Raw pyrophyllite | 50.0 | 40.0 | 45.0 | 35.0 |
| Georgia or South Carolina kaolin | 20.0 | 20.0 | 20.0 | 20.0 |
| Ball clay | 30.0 | 30.0 | 30.0 | 30.0 |
| Feldspar |  |  | 2.0 | 2.0 |
| Flint |  | 10.0 |  | 10.0 |

About ten per cent. of water will be added for dry pressing.

Calcined crude pyrophyllite can be used in wall tile when an improved product is desired but the extra cost of calcining will not ordinarily warrant the use of the calcined material for this purpose.

The ingredients are mixed in the usual way and fired under the usual conditions. Wall tile is obtained by subjecting any of the above formulae to the firing treatment known in the art as cone 11. The product may then be glazed and again fired; this time at cone 1.

A wall tile made from the crude pyrophyllite contemplated by this invention will not shiver as quickly as ordinary wall tile due to its decreased free silica content. This decrease in silica content does not increase the tendency to craze.

For general ware which is to be molded in the plastic form or cast in slip form calcined crude pyrophyllite of high sericite or other flux content compounded in the usual way according to the following formulae has been found to give satisfactory results. Ware which contains feldspar and flint has been found to be superior for certain purposes to ware which does not contain both of these ingredients.

In the manufacture of general ware according to the present invention it is also possible to substitute bond clays from Maryland, Mississippi and Illinois for a portion of the ball clay in the mix. These bond clays do not have as good color as the ball clays of Kentucky and Tennessee but with the use of crude pyrophyllite of the type contemplated herein a satisfactory white body may be obtained by using comparatively small amounts of these bond clays which add materially to the strength of the body:

|  | Percent | Percent | Percent | Percent |
|---|---|---|---|---|
| Calcined crude pyrophyllite | 50.0 | 45.0 | 35.0 | 35.0 |
| Ball clay | 30.0 | 30.0 | 30.0 | 10.0 |
| Georgia or South Carolina kaolin | 20.0 | 20.0 | 20.0 | 20.0 |
| Feldspar |  | 5.0 | 5.0 | 5.0 |
| Flint |  |  | 10.0 | 10.0 |
| Mississippi, Illinois or Maryland bond clay |  |  |  | 20.0 |

The necessary amount of water will be added to each mix. For example, material that is to be molded in a plastic condition should contain about 22% of water and material that is to be cast should contain about 30% of water. Material that is to be cast may also advantageously comprise a small amount of soda ash and sodium silicate to cause dispersion of the clay particles, as is well-known in the art. General ware mixed according to these formulae is fired in the usual way, for example, according to the operation known in the art as cone 8 or cone 9 and it may then be glazed and fired at cone 1 in the usual manner.

Ware made according to this invention is inexpensive both because of the cheap materials used and the low cost of manufacture. It is superior in many respects to earthenware bodies known in the art which do not contain pyrophyllite.

This application is a continuation of my application, Serial No. 560,871, filed September 2, 1931.

In the appended claims the term "pyrophyllite" is used to designate an aluminum silicate having in the hydrated form the formula $Al_2O_3\cdot 4SiO_2\cdot H_2O$.

I claim:

1. Semi-vitreous earthenware bodies made from a mixture comprising clay and at least 10% of pyrophyllite.

2. Semi-vitreous earthenware bodies made from a mixture comprising clay, at least 10% of pyrophyllite, and a metallic oxide capable of acting as a flux.

3. Semi-vitreous earthenware bodies made from a mixture comprising clay, at least 10% of pyrophyllite, and an alkali-metal oxide capable of acting as a flux.

4. Semi-vitreous earthenware bodies made from a mixture comprising clay, at least 10% pyrophyllite, and magnesium oxide, which oxide increases the thermal shock of the bodies.

5. Semi-vitreous earthenware bodies made from a mixture comprising clay and calcined pyrophyllite.

6. Semi-vitreous earthenware bodies made from a mixture comprising clay and from 35% to 50% of pyrophyllite.

7. Semi-vitreous earthenware bodies made from a mixture comprising clay and at least 10% of pyrophyllite containing sericite naturally associated therewith.

8. Semi-vitreous earthenware bodies made from a mixture comprising clay and at least 10% of pyrophyllite containing alkali and alkaline-earth compounds naturally associated therewith.

9. Semi-vitreous earthenware bodies made from a mixture comprising clay and at least 10% of pyrophyllite containing alkali, and alkaline-earth oxides naturally associated therewith.

10. Semi-vitreous earthenware bodies made from a mixture comprising clay, at least 10% of pyrophyllite, kaolin, ball clay, feldspar, and flint.

11. Semi-vitreous earthenware bodies made from a mixture comprising clay, at least 10% of pyrophyllite containing alkali, and alkaline-earth oxides naturally associated therewith, kaolin, ball clay, feldspar, and flint.

12. Semi-vitreous earthenware bodies made from a mixture comprising clay and crude pyrophyllite containing approximately 60% to 70% of silica, approximately 24% to 29% alumina, approximately 1½% to 4% potassium oxide, and less than 1% each of magnesium oxide and sodium oxide.

IRA ELMER SPROAT.

Certificate of Correction

Patent No. 1,984,163. December 11, 1934.

IRA ELMER SPROAT

It is hereby certified that error appears in the printed specification of the above numbered patent requiring correction as follows: Page 2, second column, line 55, for "$Al_2O_3.4Si_2O.H_2O$" read $Al_2O_3.4SiO_2.H_2O$; and that the said Letters Patent should be read with this correction therein that the same may conform to the record of the case in the Patent Office.

Signed and sealed this 22nd day of January, A. D. 1935.

[SEAL]

LESLIE FRAZER,
*Acting Commissioner of Patents.* from a mixture comprising clay and from 35% to 50% of pyrophyllite.

7. Semi-vitreous earthenware bodies made from a mixture comprising clay and at least 10% of pyrophyllite containing sericite naturally associated therewith.

8. Semi-vitreous earthenware bodies made from a mixture comprising clay and at least 10% of pyrophyllite containing alkali and alkaline-earth compounds naturally associated therewith.

9. Semi-vitreous earthenware bodies made from a mixture comprising clay and at least 10% of pyrophyllite containing alkali, and alkaline-earth oxides naturally associated therewith.

10. Semi-vitreous earthenware bodies made from a mixture comprising clay, at least 10% of pyrophyllite, kaolin, ball clay, feldspar, and flint.

11. Semi-vitreous earthenware bodies made from a mixture comprising clay, at least 10% of pyrophyllite containing alkali, and alkaline-earth oxides naturally associated therewith, kaolin, ball clay, feldspar, and flint.

12. Semi-vitreous earthenware bodies made from a mixture comprising clay and crude pyrophyllite containing approximately 60% to 70% of silica, approximately 24% to 29% alumina, approximately 1½% to 4% potassium oxide, and less than 1% each of magnesium oxide and sodium oxide.

IRA ELMER SPROAT.

Certificate of Correction

Patent No. 1,984,163. December 11, 1934.

IRA ELMER SPROAT

It is hereby certified that error appears in the printed specification of the above numbered patent requiring correction as follows: Page 2, second column, line 55, for "$Al_2O_3.4Si_2O.H_2O$" read $Al_2O_3.4SiO_2.H_2O$; and that the said Letters Patent should be read with this correction therein that the same may conform to the record of the case in the Patent Office.

Signed and sealed this 22nd day of January, A. D. 1935.

[SEAL]

LESLIE FRAZER,
Acting Commissioner of Patents.